United States Patent
Melde-Tuczai

(10) Patent No.: US 9,528,546 B2
(45) Date of Patent: Dec. 27, 2016

(54) CONNECTING ROD FOR A RECIPROCATING-PISTON ENGINE

(71) Applicant: AVL LIST GmbH, Graz (AT)

(72) Inventor: Helmut Melde-Tuczai, Graz (AT)

(73) Assignee: AVL LIST GMBH, Graz (AT)

(*) Notice: Subject to any disclaimer, the term of this patent is extended or adjusted under 35 U.S.C. 154(b) by 0 days.

(21) Appl. No.: 14/367,993

(22) PCT Filed: Dec. 13, 2012

(86) PCT No.: PCT/EP2012/075344
§ 371 (c)(1),
(2) Date: Jun. 23, 2014

(87) PCT Pub. No.: WO2013/092364
PCT Pub. Date: Jun. 27, 2013

(65) Prior Publication Data
US 2014/0366834 A1 Dec. 18, 2014

(30) Foreign Application Priority Data
Dec. 23, 2011 (AT) .............................. A 50020/2011

(51) Int. Cl.
*F02B 75/04* (2006.01)
*F16C 7/06* (2006.01)
*F02B 75/32* (2006.01)

(52) U.S. Cl.
CPC .............. *F16C 7/06* (2013.01); *F02B 75/045* (2013.01); *F02B 75/32* (2013.01)

(58) Field of Classification Search
CPC ............................. F02B 75/044; F16C 7/023

USPC ................................... 123/78 E, 48 B, 197.3
See application file for complete search history.

(56) References Cited

U.S. PATENT DOCUMENTS

| 2,217,721 A * | 10/1940 | Anthony .................... 123/78 E |
| 4,809,650 A | 3/1989 | Arai et al. |
| 2007/0175422 A1* | 8/2007 | Takahashi ................ 123/78 BA |
| 2009/0205615 A1* | 8/2009 | Cannata ...................... 123/48 B |
| 2010/0139479 A1* | 6/2010 | Pirault ........................ 92/181 P |
| 2011/0226220 A1 | 9/2011 | Wilkins |

FOREIGN PATENT DOCUMENTS

| CN | 101109321 A | 1/2008 |
| GB | 2370315 A | 6/2002 |
| JP | 63195340 A | 8/1988 |

* cited by examiner

*Primary Examiner* — Marguerite McMahon
(74) *Attorney, Agent, or Firm* — Jordan IP Law, LLC; Todd A. Vaughn

(57) ABSTRACT

A length-adjustable connecting rod for a reciprocating-piston engine. At least one first rod part and second rod part are telescopically displaceable relative to and/or into one another. The second rod part forms a guide cylinder and the first rod part forms a piston element which is longitudinally displaceable in the guide cylinder. Between the first and second rod parts is a high-pressure chamber into which at least one first oil duct opens. At least one control valve is arranged in the first oil duct, with an actuator thereof to be displaced into a first position by a spring and into a second position by oil pressure against the force of the spring. To permit adjustment of the compression ratio, a second oil duct formed as a feed duct opens into the high-pressure chamber and in which a check valve is arranged which opens in the direction of the high-pressure chamber.

8 Claims, 2 Drawing Sheets

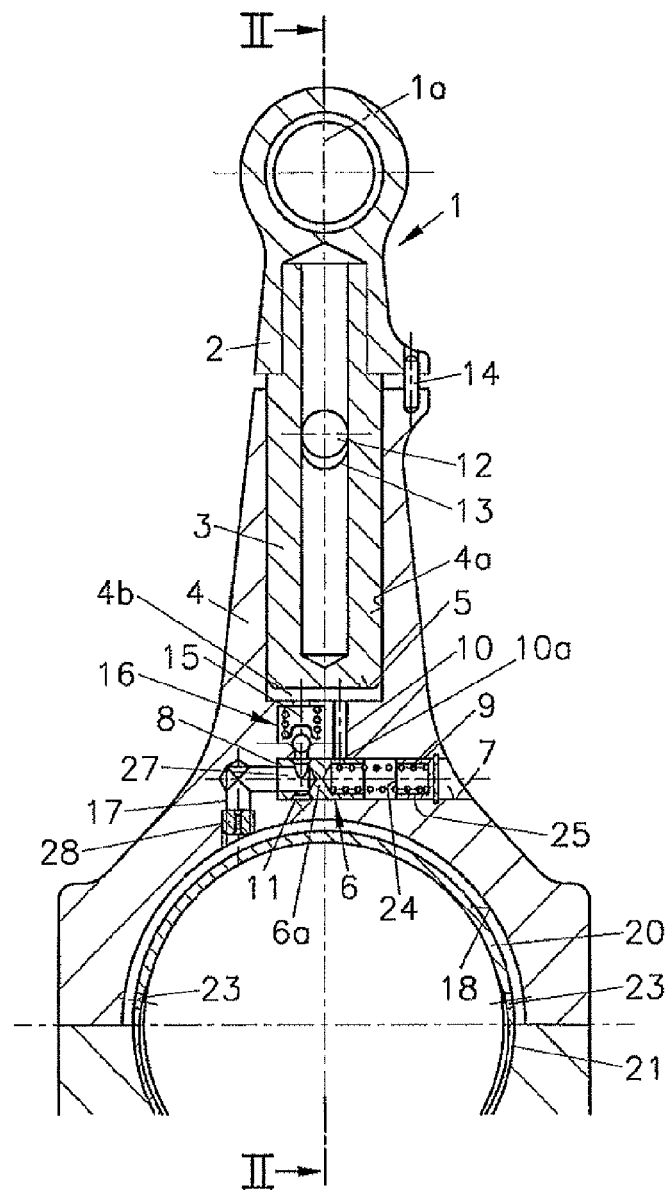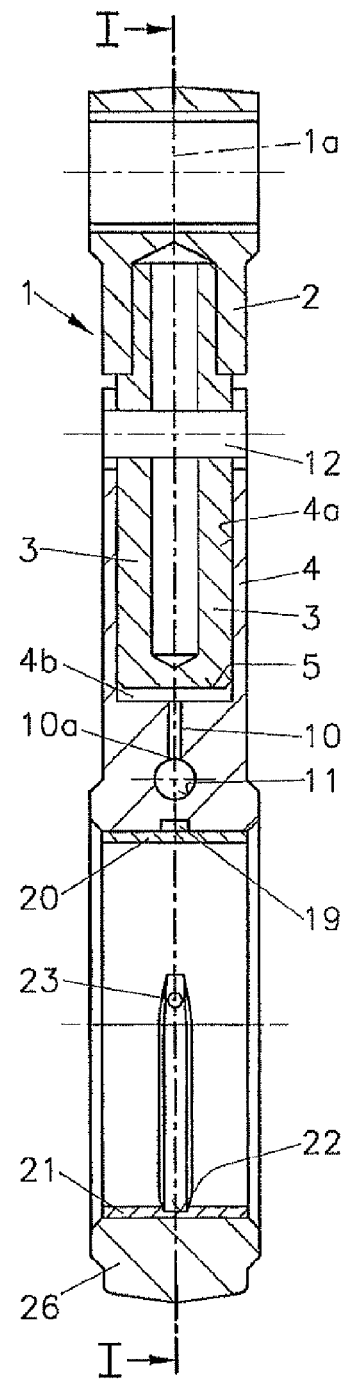
Fig.1
Fig.2

CONNECTING ROD FOR A RECIPROCATING-PISTON ENGINE

CROSS-REFERENCE TO RELATED APPLICATIONS

The present application is a National Stage Application of PCT International Application No. PCT/EP2012/075344 (filed on Dec. 13, 2012), under 35 U.S.C. §371, which claims priority to Austrian Patent Application No. A 50020/2011 (filed on Dec. 23, 2011), which are each hereby incorporated by reference in their respective entireties.

TECHNICAL FIELD

Embodiments relate to a length-adjustable connecting rod for a reciprocating-piston engine, especially an internal combustion engine, comprising at least one first and one second rod part, which two rod parts are displaceable relative to and/or into one another in a telescopic fashion, wherein the second rod part forms a guide cylinder and the first rod part forms a piston element which is longitudinally displaceable in the guide cylinder, wherein between the first and second rod part there is formed a high-pressure chamber into which at least one first oil duct opens, in which at least one valve is arranged that is formed as a control valve, the actuator of which can be displaced into a first position by a restoring spring and into a second position by oil pressure against the force of the restoring spring.

German Patent Publication No. DE 101 51 517 A1 discloses a piston and connecting rod assembly of variable length for generating a variable compression ratio in an internal combustion engine, comprising a first part and a second part which are coupled to a length-changing mechanism which is accommodated between the parts. The length-changing mechanism comprises a spring washer shaped in the form of a truncated cone, and an elastomeric mass rests on a concave surface of the spring washer.

Further connecting rods with a respective hydraulic telescopic mechanism for adjusting the connecting rod length are known from the specifications French Patent Publication No. FR 2 857 408 A1, European Patent Publication No. EP 1 243 773 A1, WO Patent Publication No. WO 02/10568 A1, German Patent Publication No. DE 198 35 146 A1, U.S. Pat. No. 4,370,901 A, U.S. Pat. No. 4,195,601 A, U.S. Pat. No. 4,124,002 A and U.S. Pat. No. 2,134,995 A.

The specification U.S. Pat. No. 2,217,721 A discloses an internal combustion engine with a length-adjustable connecting rod with a first and second rod part, which rod parts are displaceable to and into each other in a telescopic fashion. A high-pressure chamber is opened between the two rod parts into which an oil duct opens. A control valve with an axially displaceable closure element is provided for refilling and discharging the high-pressure chamber with oil and thus for length-displacement of the connecting rod, which closure element is displaceable by a restoring spring to a first closed position and by oil pressure against the force of the restoring spring to a second open position.

By changing the compression, full load can be operated with lower compression ratios, and partial load and starting can be operated at a higher ratio. Consumption is improved in the part-load range, the compression pressure is increased with the increased compression ratio during starting, and the peak pressure is decreased with reduced ratio at high power, and knocking is prevented.

It is known to use an eccentric piston pin or an eccentric crankpin of the crankshaft for adjusting the compression ratio. It is further known to lift the entire cylinder block or the entire crankshaft bearing with an eccentric bearing of the same in the crankcase for changing the compression ratio.

All these proposals require a high level of effort with respect to construction and control technology.

SUMMARY

It is the object of the invention to avoid these disadvantages and to provide a simple solution for changing the compression ratio.

This is achieved in accordance with the invention in such a way that a second oil duct formed as a feed duct opens into the high-pressure chamber, in which second oil duct a check valve is arranged which opens in the direction of the high-pressure chamber, wherein the control valve has a setting piston which is axially displaceable in a receiving bore and which opens and closes by way of control the first and second oil duct, wherein preferably the first oil duct is closed in the first position and is open in the second position. Simple control is achieved when the first oil duct is arranged as a feed and discharge duct.

An oil supply duct, which is preferably flow-connected to the connecting-rod bearing, opens into the receiving bore, wherein especially preferably a throttling point is arranged in the oil supply duct. A negative pressure wave with respect to the oil in the connecting rod bearing, which negative pressure wave is produced during the intake by the inertial force of the first rod part, can be weakened. The second oil supply duct can originate from the receiving bore of the control valve or from the oil feed duct.

It is provided in an embodiment which is simple to produce that the receiving bore is formed by a borehole transversely to the longitudinal axis of the connecting rod. An especially compact embodiment can be achieved when the valve is arranged in the region of a large rod big-end of the connecting rod.

DRAWINGS

Embodiments will be explained below in closer detail by reference to the drawings, wherein:

FIG. 1 illustrates a sectional view of a connecting rod in accordance with embodiments along the line I-I in FIG. 2 in a first switching position.

FIG. 2 illustrates the connecting rod in a sectional view along the line II-II in FIG. 1.

DESCRIPTION

Figure 3:
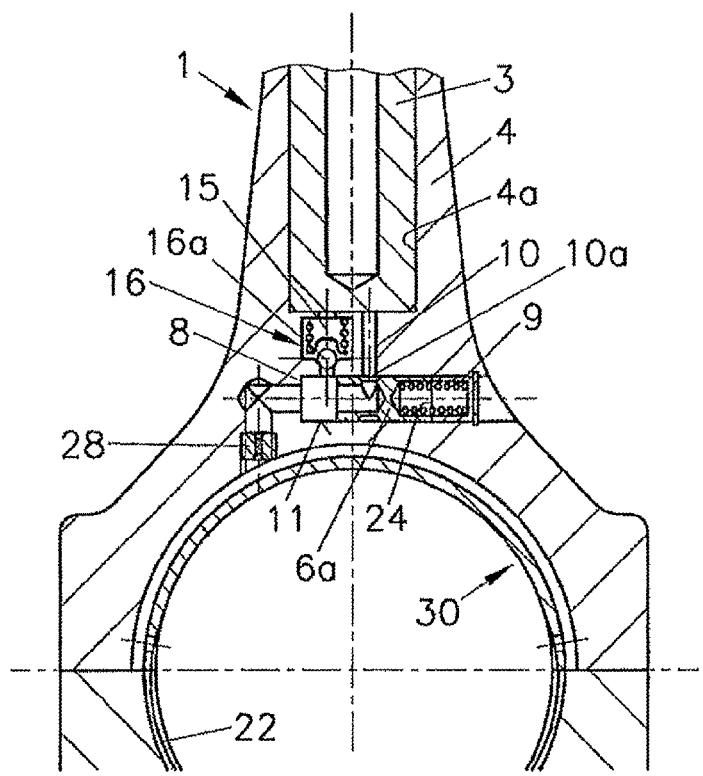
FIG. 3 illustrates the connecting rod in a sectional view similar to FIG. 1 in a second switching position.

FIGS. 1 to 3 respectively illustrate a two-piece connecting rod 1 of an internal combustion engine. A cylindrical piston element 3 is pressed into an upper first rod part 2. The bottom part of the piston element 3 sits with play in a guide cylinder 4a of a lower second rod part 4 of the connecting rod 1. A high-pressure chamber 4b is opened between the piston element 3 and the lower second rod part 4 in at least one position of the two rod parts 2, 4. A pressure-side bottom face end 5 of the piston element 3 adjacent to the high-pressure chamber 4b is supplied with motor oil. The oil supply, blockage and discharge of the oil is controlled by a control valve 6, which is arranged in a first oil duct 10 and which comprises a setting piston 6a that is axially displaceable in a receiving bore 7, via the oil pressure on the oil pump (not illustrated in closer detail) by way of a pressure control valve (not illustrated). An actuator (not illustrated) pre-tensions a spring in the control valve of the oil pump to a higher or lower extent.

FIG. 1 illustrates the connecting rod 1 in a first position associated with a high compression ratio and FIG. 3 in a second position associated with a low compression ratio.

The setting piston 6a is pressed against the first stop 8 by the force of the restoring spring 9 at a low oil pressure level in its receiving bore 7 formed by a borehole transversely to the longitudinal axis 1a of the connecting rod 1. The motor oil is sucked in beneath the face end 5 of the piston 3 by the inertial force via the check valve 16 arranged in a second oil duct 15. The control piston 6a blocks the first oil duct 10 with its cylinder jacket 11, which oil duct forms a feed and discharge opening. The sucked-in oil cannot escape and is not compressible. Consequently, the piston element 3 is lifted and the connecting rod 1 thus becomes longer. As a result, a higher compression ratio can be set at normal and low oil pressure. If the control pressure of the oil pump is now increased, the control piston 6a is pressed in its receiving bore 7 by the motor oil against the second stop 24 (as illustrated in FIG. 3) which is formed by the spring guide 25. The restoring spring 9 is compressed in this process. A connecting opening 10a of the first oil duct 10 for the motor oil from the connecting-rod bearing 30 to the face end 5 is opened up by the control piston 6. In this position, the gas pressure from the combustion chamber (not illustrated in closer detail) presses the piston element 3 fully downwardly, thus setting a lower compression ratio.

It is also especially advantageous that a higher compression ratio can be set even in a lower idling range of the internal combustion engine when the motor oil pressure is lower than the control pressure, which improves consumption in the low-load range and facilitates cold starting. In order to maintain the high compression ratio over a prolonged period of time, leakage losses by the play of the guide cylinder 4a from the high-pressure chamber 4b beneath the face end 5 of the piston element 3 must be refilled in the same again. This occurs in such a way that the inertial force sucks in the motor oil from the inner bore 27 of the control piston 6a via the check valve 16 (refilling valve) into the high-pressure chamber 4b beneath the face end 5.

During the subsequent compression cycle, high pressure is built up again and the small ball 16a in the check valve 16 prevents the escape of oil from the high-pressure chamber 4b. This process is repeated in every working cycle. If the compression ratio is to be reduced again, the control pressure of the oil pump is increased and the control piston 6 is pressed by the oil pressure against the second stop 24 and the connecting opening 10a to the connecting-rod bearing 30 is thus open. The gas pressure presses the piston element 3 in the downward direction and the lower compression ratio is set again. The control piston 6 is pushed back and forth in its receiving bore 7 by the oil pressure and the restoring spring 9 between the stops 8 at low oil pressure and 24 at high oil pressure.

A cylindrical pin 12, which is pressed into the piston element 3, prevents the first part 2 of the connecting rod 1 from flying out by the inertial force. The pin 12 can move upwardly and downwardly in an oblong hole 13 in the bottom second rod part 4 of the connecting rod 1 according to the planned extension of the connecting rod 1.

The oil supply of the receiving bore 7 of the control piston 6 and its inner bore 27 occurs via the oil supply duct 17. It opens into a groove 19 in the base bore 18 of the connecting-rod bearing shell 20 of the connecting-rod bearing 30. The groove 19 in the connecting rod 1 is flow-connected to a groove 22 in the bottom shell 21 via bores 23. The bottom shell 21 sits in the connecting-rod cover 26.

A throttle 28 is installed in the supply bore 17 in order to weaken the negative pressure wave in relation to the oil in the groove 19, which negative pressure wave is produced during intake by the inertial force. An axial pin 14 secures the upper first part 3 against twisting.

What is claimed is:

1. A connecting rod for a reciprocating-piston engine, comprising:
   at least one first connecting rod part defining a piston element;
   at least one second connecting rod part defining a guide cylinder and into which the piston element which is longitudinally displaceable, wherein the at least one first connecting rod part and the at least one second connecting rod part are telescopically displaceable relative to and/or into one another in order to adjust the length of the connecting rod;
   a high-pressure chamber between the at least one first connecting rod part and the at least one second connecting rod part;
   at least one first oil duct which opens into the high-pressure chamber;
   at least one control valve which may be displaced into a first position by a spring and into a second position by oil pressure against a force of the spring;
   a second oil duct which opens into the high-pressure chamber;
   a check valve arranged in the second oil duct and which opens in a direction of the high-pressure chamber,
   wherein the at least one control valve has a setting piston which is axially displaceable in a receiving bore and which opens and closes the at least one first oil duct and the second oil duct,
   an oil supply duct which opens into the receiving bore; and
   a throttling point arranged in the oil supply duct.

2. The connecting rod of claim 1, wherein the at least one first oil duct is closed in the first position and is open in the second position.

3. The connecting rod of claim 1, wherein the at least one first oil duct comprises a feed and discharge duct.

4. The connecting rod of claim 3, wherein the second oil duct originates from the receiving bore of the at least one control valve.

5. The connecting rod of claim 3, wherein the second oil duct originates from an oil supply duct.

6. The connecting rod of claim 1, wherein the oil supply is flow-connected to a connecting-rod bearing.

7. The connecting rod of claim 1, wherein the receiving bore is formed by a borehole transversely to a longitudinal axis of the connecting rod.

8. A connecting rod for a reciprocating-piston engine, comprising:
   at least one first connecting rod part and at least one second connecting rod part which are displaceable relative to and/or into one another in a telescopic fashion, the at least one second connecting rod part forming a guide cylinder and the at least one first connecting rod part forming a piston element which is longitudinally displaceable in the guide cylinder, wherein between the at least one first connecting rod part and the at least one second connecting rod part is formed a high-pressure chamber into which at least one first oil duct opens, at least one control valve arranged in the at least one first oil duct and which may be displaced into a first position by a restoring spring and into a second position by oil pressure against a force of the spring, a second oil duct formed as a feed duct which opens into the high-pressure chamber, a check valve arranged in the second oil duct and which opens in a direction of the high-pressure chamber, wherein the at least one control valve has a setting piston which is axially displaceable in a receiving bore and which opens and closes the at least one first oil duct and the second oil duct;

an oil supply duct which opens into the receiving bore; and a throttling point arranged in the oil supply duct.

* * * * *